United States Patent [19]

McNeill

[11] Patent Number: 4,618,161
[45] Date of Patent: Oct. 21, 1986

[54] TOWING DEVICE

[75] Inventor: John M. McNeill, Memphis, Tenn.

[73] Assignee: James K. McNeill, Senatobia, Miss.

[21] Appl. No.: 754,612

[22] Filed: Jul. 12, 1985

[51] Int. Cl.⁴ .............................................. B60P 3/12
[52] U.S. Cl. ..................................... 280/402; 414/563
[58] Field of Search .......................... 280/402; 414/563

[56] References Cited

U.S. PATENT DOCUMENTS

| | | | |
|---|---|---|---|
| 2,593,764 | 4/1952 | Kaunitz | 414/563 X |
| 2,604,302 | 7/1952 | Francis | 414/563 X |
| 3,667,630 | 6/1972 | Scott | 414/563 |
| 3,721,356 | 3/1973 | McNeill | 414/563 |

FOREIGN PATENT DOCUMENTS

| 692487 | 7/1965 | Italy | 280/81 A |
|---|---|---|---|
| 2069951 | 9/1981 | United Kingdom | 280/402 |

Primary Examiner—John A. Pekar
Attorney, Agent, or Firm—Walker & McKenzie

[57] ABSTRACT

An apparatus for being attached to the fifth-wheel mechanism of towing tractor for towing a disabled tractor-trailer. An arm is pivotally mounted on a body for movement between one or more raised positions and a lowered position. The body is attached to the towing tractor. A coupling mechanism is provided to attach the front of the disabled tractor-trailer to the arm. A lifting mechanism is provided to move the arm between the raised and lowered positions.

7 Claims, 22 Drawing Figures

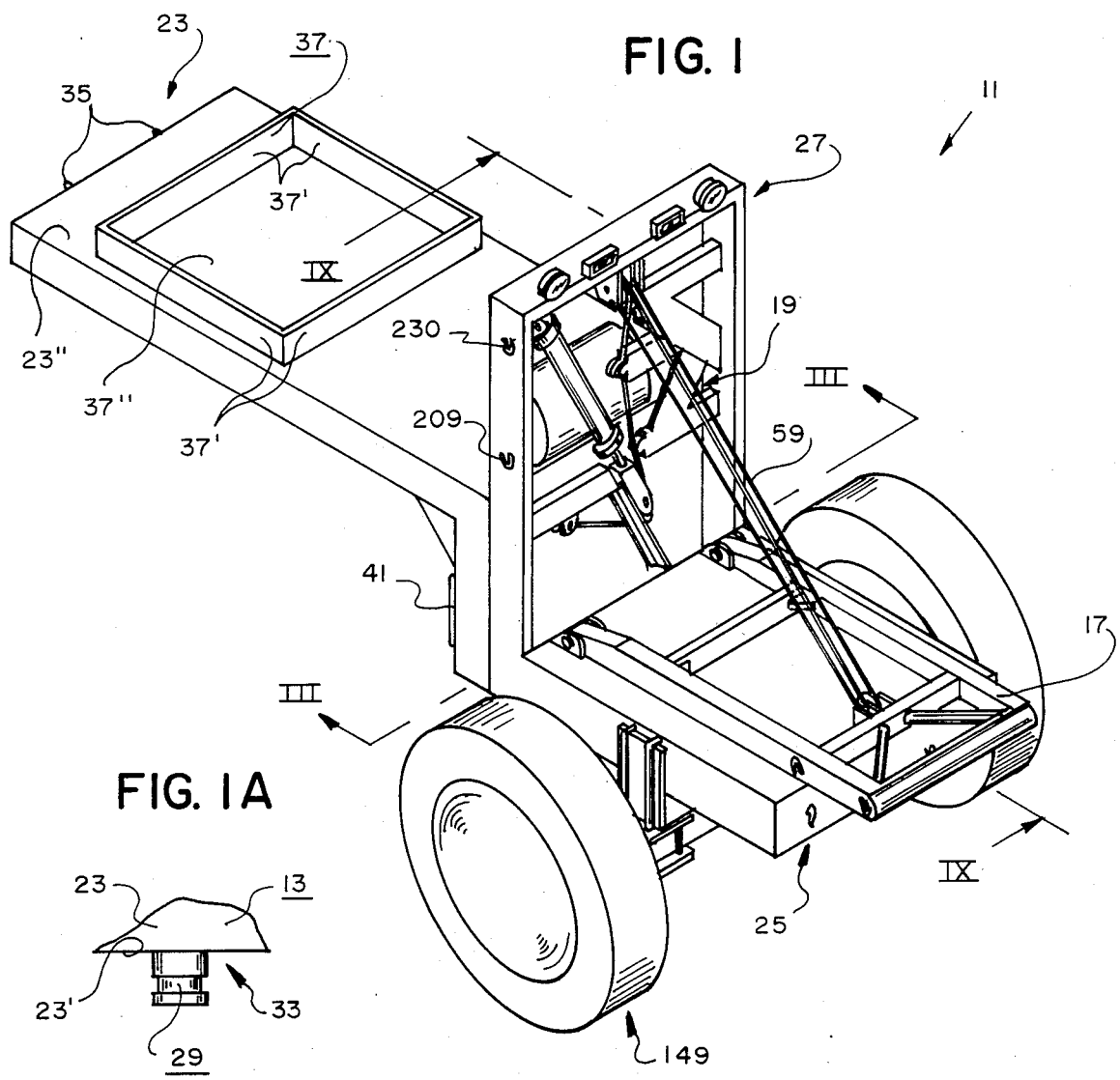
FIG. 1
FIG. 1A
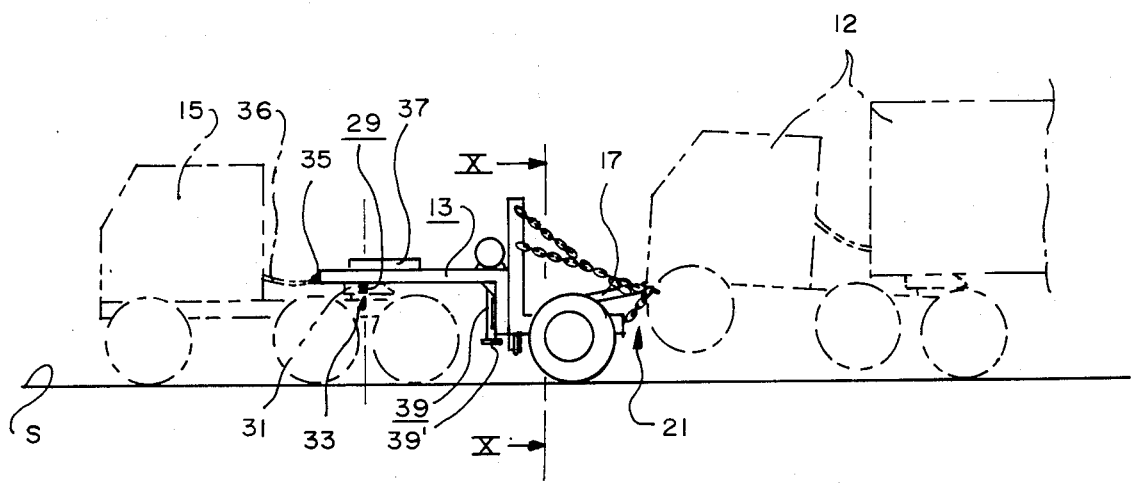
FIG. 2

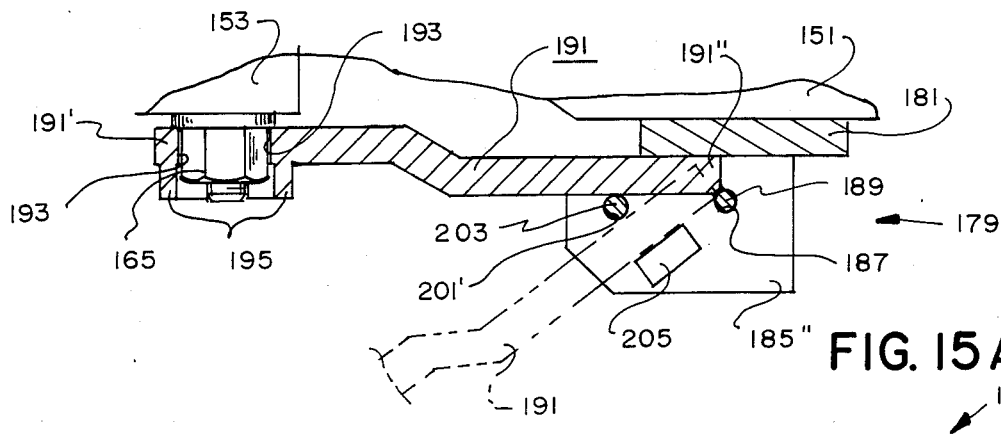
FIG. 14
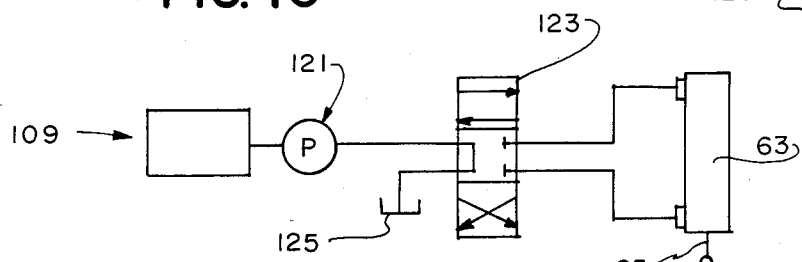
FIG. 15
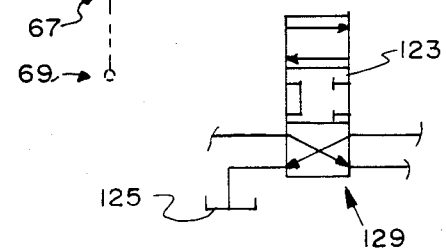
FIG. 15A
FIG. 15B
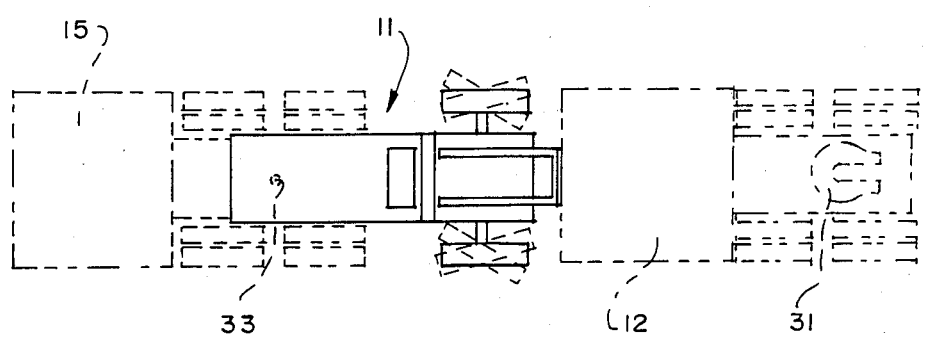
FIG. 16

FIG. 18
FIG. 19
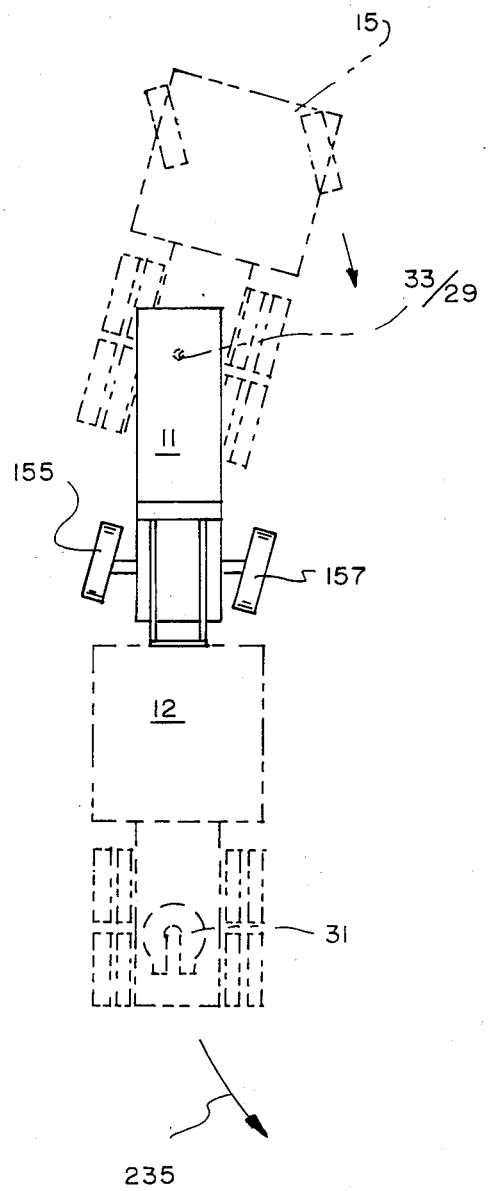
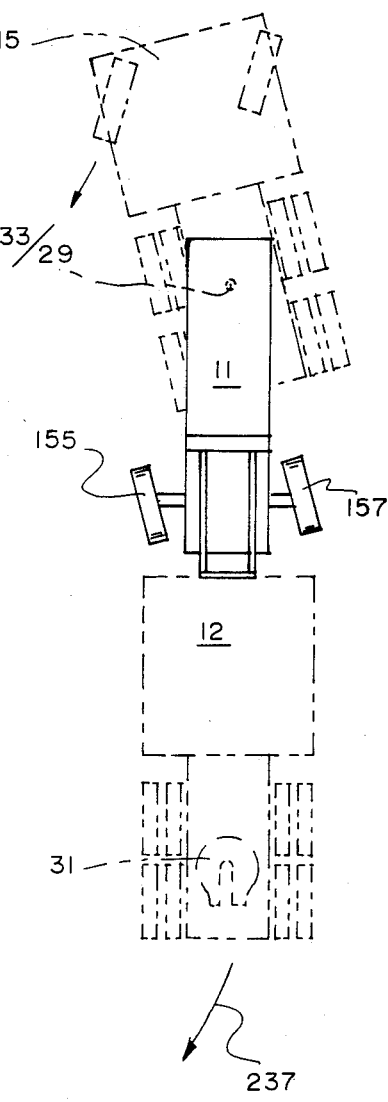

TOWING DEVICE

BACKGROUND OF THE INVENTION

1. Field of the Invention

The present invention relates to a towing apparatus for towing disabled tractor-trailers or the like.

2. Description of the Prior Art

Various patents have issued in the field of towing devices and the like. See, for example, the following United States Patents: U.S. Pat. No. 3,692,331 granted to Vegors; U.S. Pat. No. 3,843,093 granted to Thompson et al; U.S. Pat. No. 3,825,132 granted to Colangelo; U.S. Pat. No. 3,779,407 granted to Gillem; U.S. Pat. No. 3,667,630 granted to Scott; U.S. Pat. No. 3,593,865 granted to Moor et al; U.S. Pat. No. 3,770,149 granted to Aquila; U.S. Pat. No. 3,599,812 granted to Hasstedt et al; U.S. Pat. No. 3,721,356 granted to McNeill; U.S. Pat. No. 2,593,764 granted to Kaunitz, Jr.; U.S. Pat. No. 3,767,069 granted to White, Jr. et al; U.S. Pat. No. 4,274,791 granted to Moon; U.S. Pat. No. 3,924,763 granted to Pigeon; U.S. Pat. No. 3,715,042 granted to Rellinger; U.S. Pat. No. 2,604,302 granted to Francis; U.S. Pat. No. 3,207,338 granted to Felburn; U.S. Pat. No. 2,481,223 granted to Johnson. None of these patents disclose or suggest the present device.

SUMMARY OF THE INVENTION

The present invention is directed toward providing a portable towing apparatus to be connected to the fifth wheel of a towing tractor for towing a disabled tractor-trailer or the like.

The present invention comprises, in general, a body means for attachment to a towing tractor, an arm means pivotally attached at one end to the body means for allowing the other end to be raised or lowered, a lifting means for the movement of the arm means, and a coupling means for attaching the arm means to the front of a disabled tractor-trailer or the like.

One of the objects of the present invention is to provide a portable low cost towing apparatus that may be attached to any available fifth wheel type tractor.

A further object is to provide a free standing towing apparatus that is easily and quickly attached to the towing tractor.

BRIEF DESCRIPTION OF THE DRAWINGS

FIG. 1 is a perspective view of a tractor-trailer towing apparatus of the present invention with certain parts (e.g., chains) not shown for purpose of clarity.

FIG. 1A is a side elevational view of a king pin, the front view being substantially similar thereto.

FIG. 2 is a substantially reduced left side elevational view showing the towing apparatus attached to a towing tractor and coupled to the front of a disabled tractor-trailer rig with the towing tractor and disabled tractor-trailer shown in phantom lines.

FIG. 14 is a sectional view substantially taken as on line XIV—XIV of FIG. 13.

FIG. 15 is a diagrammatic view of the hydraulic system of the present invention; FIGS. 15A and 15B are diagrammatic views of portions of the hydraulic system in moved positions.

FIG. 16 is a diagrammatic top plan view showing the towing apparatus attached to a towing tractor and the arm means coupled to the front of a disabled tractor for the backing of the tractor thereof with the towing tractor and the disabled tractor shown in phantom lines and with certain parts (e.g., chains) not shown for the purpose of clarity.

FIG. 18 is a diagrammatic top view of the towing apparatus coupled to a towing tractor and disabled tractor showing the position of the wheel means while backing the towing apparatus of the present invention and showing the towing tractor and disabled tractor in phantom lines.

FIG. 19 is a diagrammatic top view of the towing apparatus coupled to a towing tractor and a disabled tractor showing the position of the wheel means while backing the towing apparatus of the present invention and showing the towing tractor and disabled tractor in phantom lines.

DESCRIPTION OF THE PREFERRED EMBODIMENT

Figure 3:
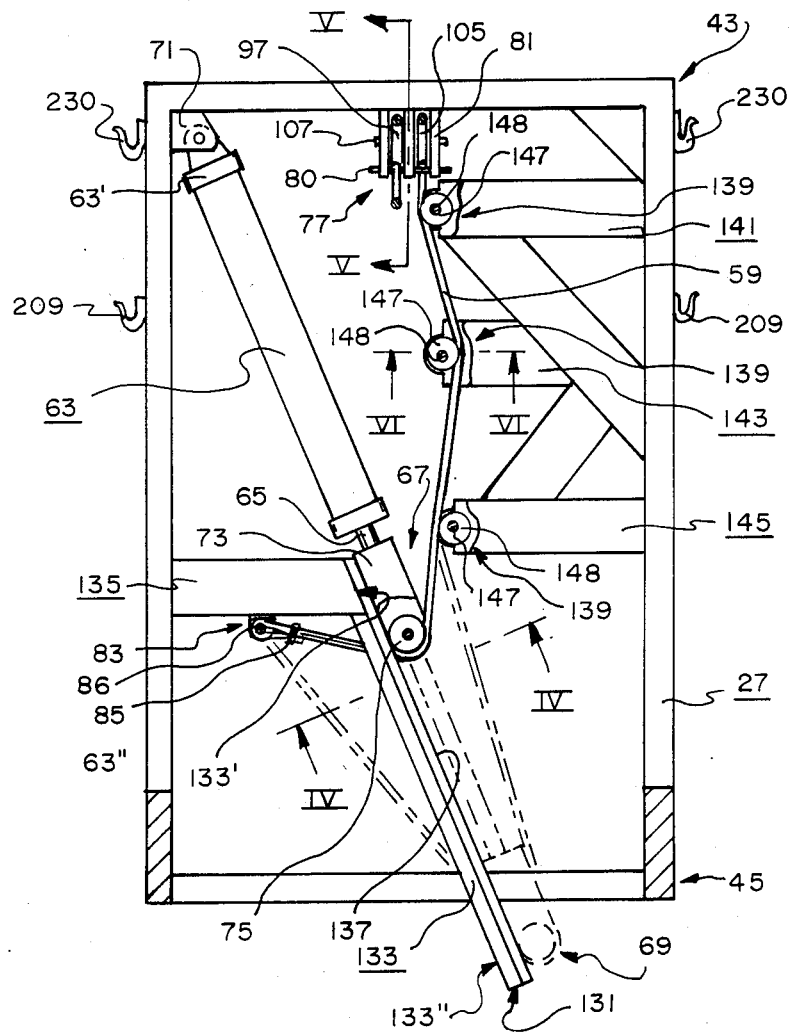
FIG. 3 is a fragmentary sectional view substantially as taken on line III—III of FIG. 1 with portions broken away for purpose of illustration.

The towing apparatus 11 of the present invention is for towing a disabled tractor trailer rig 12 or the like. The towing apparatus 11 includes, in general, a body means 13 which is attached to a towing tractor 15, an arm means 17 which is pivotally attached at one end to the body means 13 while the adjacent end may be raised or lowered, a lifting means 19 for the raising and lowering of the arm means 17, a coupling means 21 for attaching the arm means 17 to the front of a disabled tractor trailer rig 12 or the like (see, in general, FIG. 1).

The body means 13 is constructed out of a rigid metal material in a manner well known to those skilled in the art. The body means 13 includes a first end 23, a second end 25, and an upwardly extending mast 27 located between the first and second ends 23, 25 thereof (see, in general, FIG. 1).

The towing apparatus 11 includes a standard downwardly extending SAE type king pin 29 fixedly attached to the bottom side 23' of the first end 23 of the body means 13 (see, in general, FIG. 1A) in any manner well known to those skilled in the art. The king pin 29 extends in a downwardly position as to engage with and be firmly held by a standard fifth wheel locking device 31 located on the rear portion of a towing tractor 15 (see, in general, FIG. 2). The king pin 29 coacts with the fifth wheel locking device 31 to define pivot point 33 of the towing apparatus 11 and will be referred to later in the description.

A pair of air coupling devices 35, commonly referred to as gladhands, are located preferably on the extreme front portion of the first end 23 of the body means 13 (see, in general, FIGS. 1 and 2). The gladhands 35 coact with a pair of substantially similar gladhands mounted on the ends of a pair of hoses 36 of the towing tractor 15 (see, in general, FIG. 2) to allow the brake system of the towing apparatus 11 to be operatively coupled to the brake system of the towing tractor 15.

Also, a hose (now shown) is preferably run from the towing tractor 15 to the disabled tractor-trailer 12 for allowing the brake system of the disabled tractor-trailer 12 (i.e., the brakes commonly known and referred to as "California brakes") to be operatively coupled to the brake system of the towing tractor 15 in any manner known to those skilled in the art.

The brake system of the towing apparatus 11 may include the standard air brake system commonly used on semi-tractors and tractor trailer rigs and may include a standard air tank (not shown) located on the body means 13 of the towing apparatus 11 in any manner well known to those skilled in the art.

The towing apparatus 11 may include an electric circuit for allowing various electric items on the towing apparatus 11 to be powered. The electrical circuit may include a typical electrically conductive wire (not shown) connecting the various items and may include a standard electrical receptical (not shown) of the type normally used on all semi-trailers, located on the extreme front portion between the gladhands 35 of the first end 23 of the body means 13 and electrically attached to the wire for receiving a typical trailer electrical plug of the towing tractor 15 to electrically connect the standard 12 volt electrical power system of the towing tractor 15 to the towing apparatus 11 for supplying power to such items as running lights, brake lights, turn signals, and flood lights, etc. which may be located on the top crossmember of the mast 27.

The towing apparatus 11 may include a box member 37 for holding grab chains, hooks, and tools, etc.

The box member 37 includes four upwardly extending elongated side members 37' fixedly attached in a manner as to form a substantially square box member 37. The box member 37 may include a bottom member 37" fixedly attached to the lower portion of the side members 37' and may be attached to the top 23" of the first end 23 of the body means 13 in any manner well known to those skilled in the art (see, in general, FIGS. 1 and 2).

The towing apparatus 11 preferably includes a typical trailer landing gear consisting of a retractable trailer jack 39 for supporting the first end 23 of the towing apparatus 11 when parked and not attached to a towing tractor 15. The jack 39 includes an engagable handle member 41 that is placed in a concealed position under the body means 13 when not in use. The handle member 41 is engaged with the jack 39 and rotated in one direction causing the foot 39' of the jack 39 to be lowered. Conversely, rotating the handle member 41 in the opposite direction causes the foot 39' of the jack 39 to be raised (see, in general, FIGS. 2 and 9). The jack 39 is preferably located between the first and second ends 23, 25 in front of the mast 27 of the body means 13, and centered between the right and left sides thereof. The landing gear is similar to the type used on all semi-trailers and well known to those skilled in the art.

Figure 9:
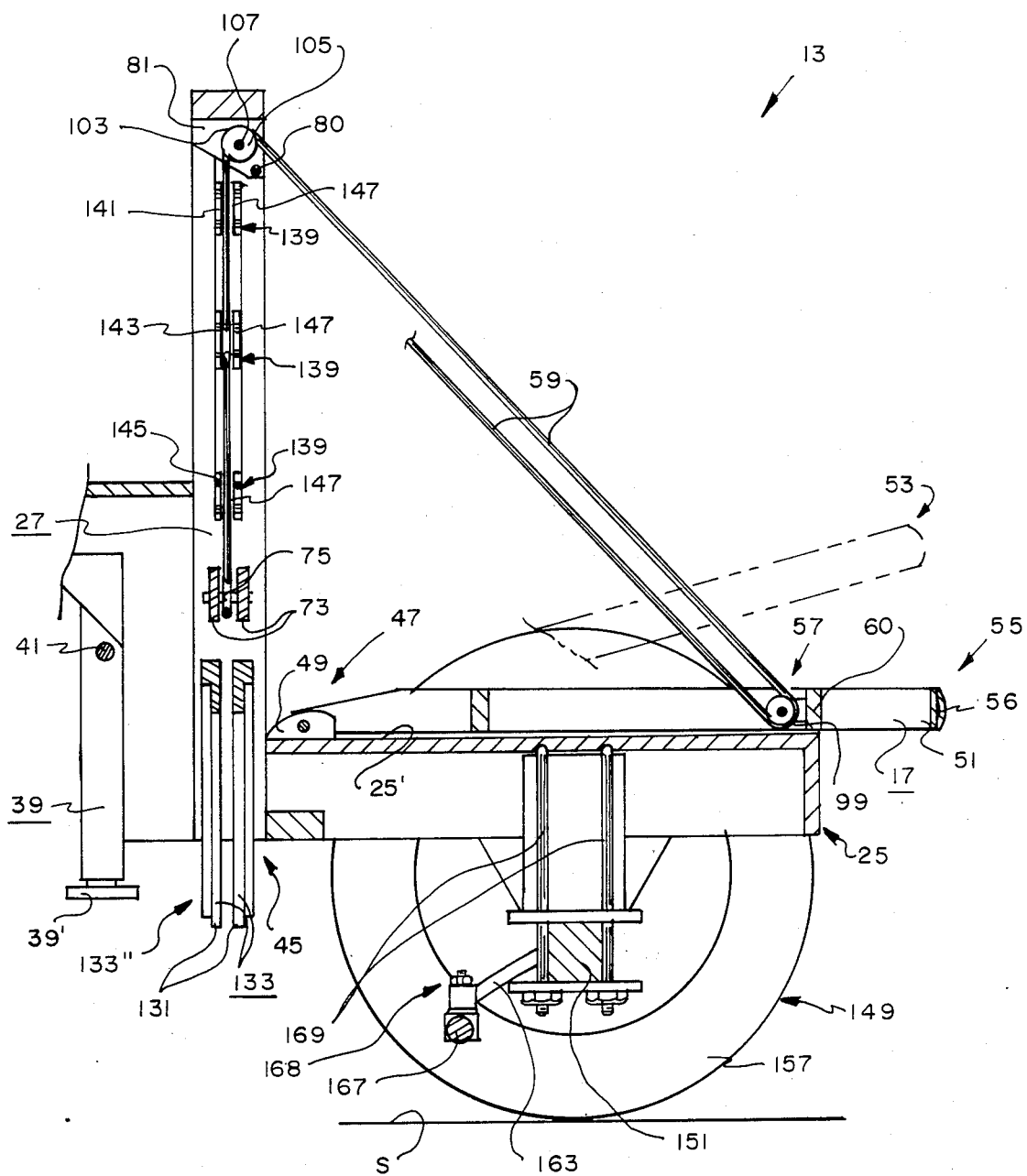
FIG. 9 is an enlarged sectional view substantially as taken on line IX—IX of FIG. 1, showing in phantom lines the arm means in the raised position.

The mast 27 contains an upper end 43 and a lower end 45 fixedly attached to the second end 25 of the body means 13 and extending upwardly at a right angle therefrom as shown in FIGS. 1, 2 and 9.

The towing apparatus 11 includes an arm means 17 which has a first end 47 pivotally mounted by a pivoting means 49 to the top surface 25' of the second end 25 of the body means 13 adjacent the rear of the mast 27 therefore allowing the adjacent second end 51 of the arm means 17 to be pivoted between a raised position 53 and a lowered position 55 (see, in general, FIG. 9). The arm means 17 includes a pulley block 57 which has a plurality of sheave members (the sheave members will be described later in the description) for guidingly supporting a cable member 59 therethrough. The pulley block 57 is fixedly attached in any manner well known to those skilled in the art to substantially the middle of a cross-member 60 defining, in part, the second end 51 of the arm means 17, with the sheave members directed toward the first end 47 thereof. The distal portion of the second end 51 of the arm means 17 contains a substantially half cylindrical, outwardly directed surface 56 for providing a relatively smooth surface that contacts the front end of the disabled tractor 12 of the like.

The towing apparatus 11 includes an adjustment means 61 which may include a linear device such as a double acting hydraulic cylinder 63 or the like having an enclosed movable piston means (not shown) with an outwardly extending piston rod 65 attached thereto which is movable between a contracted position 67 and an extended position 69 (see, in general, FIG. 3). The cylinder 63 has a first end 63' mounted by a pivoting means 71 to the upper left hand corner of the mast 27 and a second end 63" which has a single pulley block 73 and sheave member 75 attached to the movable piston rod 65 for engagement with the cable member 59 for raising and lowering the second end 51 of the arm means 17 of the body means 13 thereof.

Referring to FIG. 3 the cable member 59 includes a first end 77 fixedly attached by clamp member 79 and a pin 80 to the frame of a pulley block 81 that is fixedly attached by well known means such as being electric arc welded to a crossmember at the upper end 43 of the mast 27. The cable member 59 includes a second end 83 fixedly attached to a crossmember adjacent the lower end 45 of mast 27 by a clasp member 85 which is substantially similar to clamp member 79 of the first end 77, and a pin 86.

Figure 7:
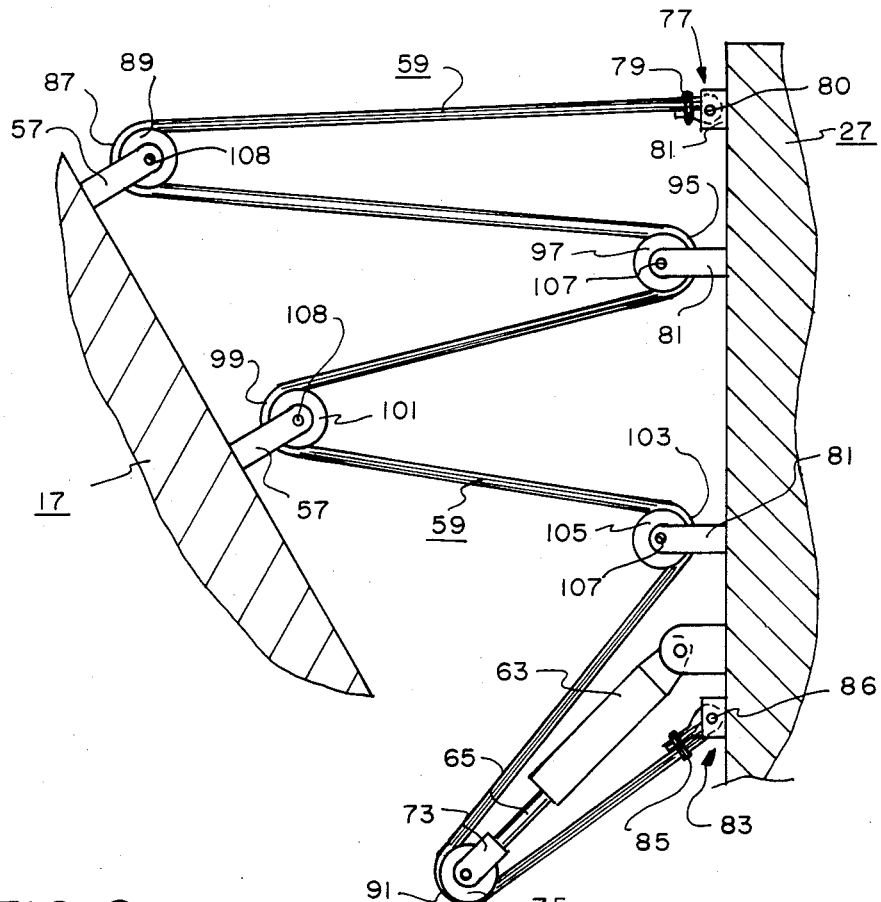
FIG. 7 is a diagrammatic drawing representing the cable arrangement thereof.
Figure 8:
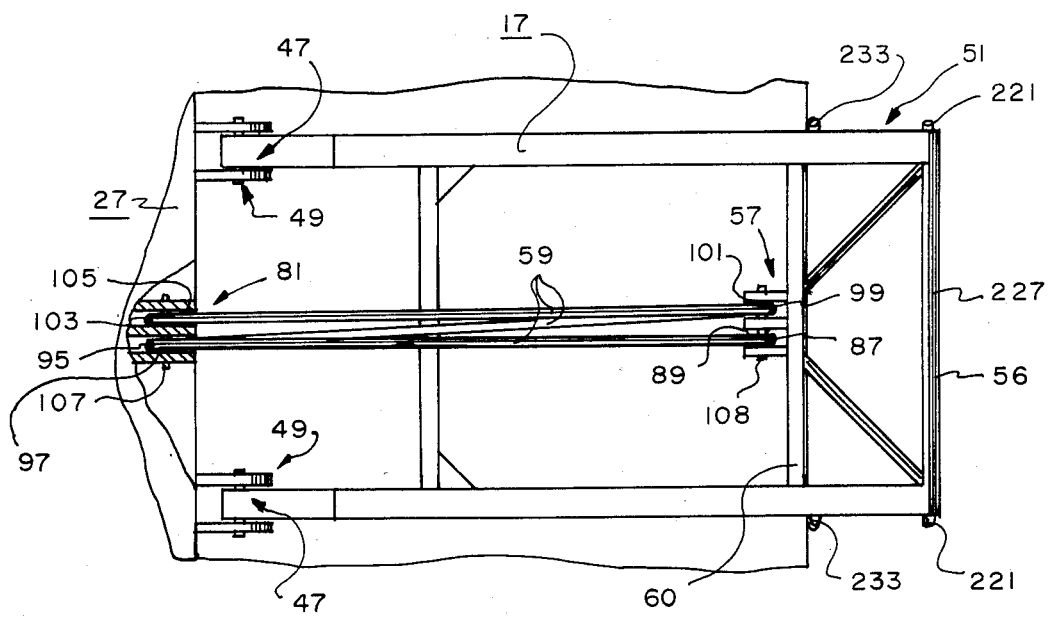
FIG. 8 is a top plan view showing the arm means of the towing apparatus of the present invention with a portion of the mast broken away for purpose of illustration.

Referring now to diagrammatic FIG. 7 the cable member 59 includes a first bight 87 extending about a first sheave member 89 which is located in the left hand side of pulley block 57 of the arm means 17 (shown in FIG. 8), includes a second bight 91 extending about a second sheave member 75 fixedly attached to pulley block 73 of the piston rod 65 of the second end 63" of cylinder 63 of the adjustment means 61, includes a third bight 95 extending about a third sheave member 97 located in the left hand side of pulley block 81 in the upper end 43 of mast 27, includes a fourth bight 99 extending about fourth sheave member 101 located in the right hand side of pulley block 57 of the arm means 17, and includes a fifth bight 103 extending about fifth sheave member 105 located in the pulley block 81 of the upper end 43 of the mast 27. The third and fifth sheave members 97, 105 are rotatably attached in a manner well known to those skilled in the art, such as a pin 107 to the pulley block 81 of the upper end 43 of the mast 27 while the first and fourth sheave members 89, 101 are attached in a similar manner, such as by way of a pin 108, to pulley block 57 of the second end 51 of the arm means 17.

The cylinder 63 may be actuated preferably by a hydraulic system which is shown diagrammatically in FIG. 15 of the drawings and which contains a motor 109 (which may be electric or gasoline), a hydraulic pump 121, a valve 123 which is a three position valve in which the neutral position as shown in FIG. 15 allows the pressurized fluid to flow into a reservoir 125. When the valve 123 is actuated to the position 127 as shown in FIG. 15A, the pressurized fluid is allowed to flow in the upper end of cylinder 63 therefore pushing the piston rod 65 into the extended position 69. Conversely, moving the valve 123 to the position 129 as shown in FIG. 15B, the pressurized fluid is allowed to enter in front of the piston therefore moving the piston rod 65 into the contracted position 67.

The cylinder 65 may be actuated pneumatically therefore the towing apparatus 11 may contain a pneumatic system substantially similar to the hydraulic system shown in FIG. 15 but including an air compressor rather than a hydraulic pump, etc.

The cylinder 65 may be replaced by an electric motor having a pinion or spur gear attached thereto, therefore using a rack type gear fixedly attached to the pulley block 73 in a manner well known to those skilled in the art, for the movement thereof.

Figure 10:
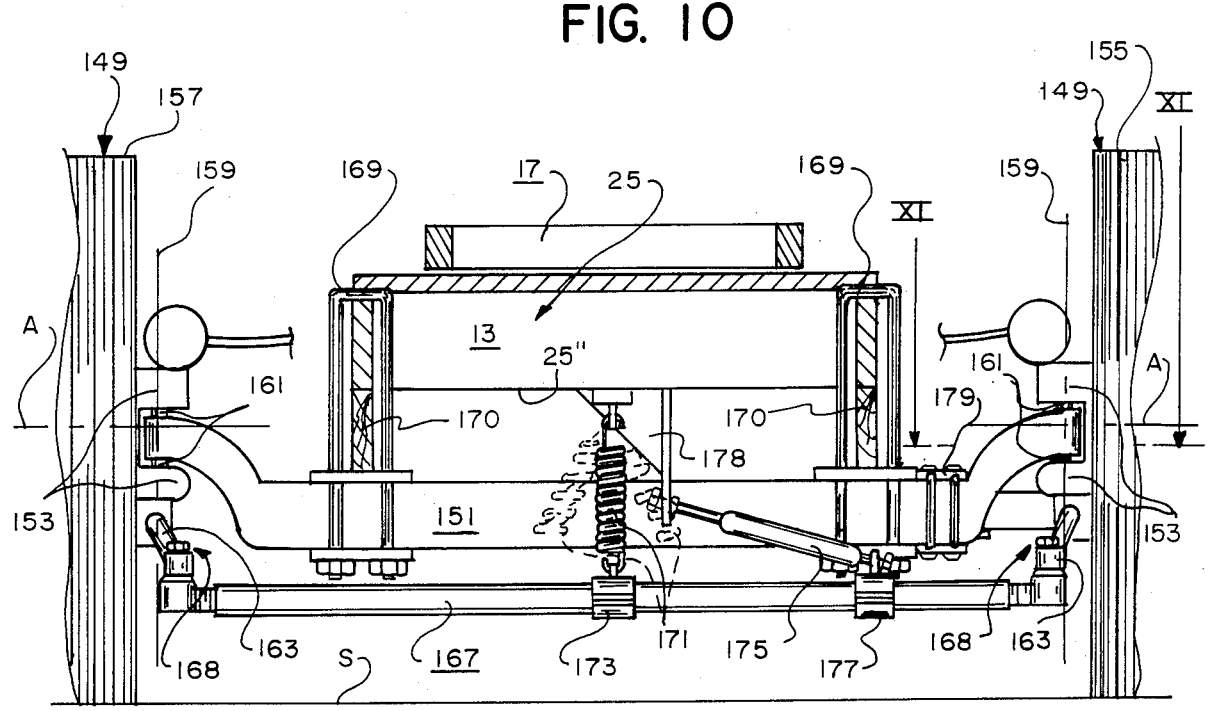
FIG. 10 is an enlarged sectional view substantially as taken on line X—X of FIG. 2.

The extension of the piston rod 65 with attached pulley block 73 and sheave 75 will cause the engaged cable member 59 to be moved downwardly into the extended position 69 thus effectively shortening the overall extension of the cable member 59. The cable member 59 therefore is moved through first, second, third, fourth, and fifth sheave members 75, 89, 97, 101 and 105 therefore causing the second end 51 of the arm means 17 to be moved to a raised position 53 as shown in FIGS. 2 and 10.

Figure 4:
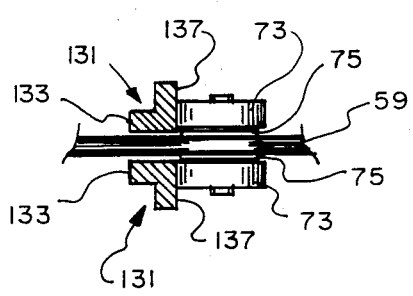
FIG. 4 is an enlarged sectional view substantially as taken on line IV—IV of FIG. 3.
Figure 5:
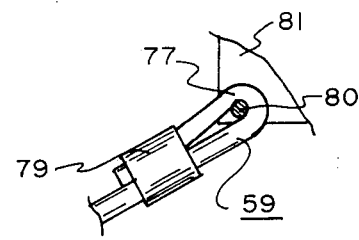
FIG. 5 is an enlarged fragmentary sectional view substantially as taken on line V—V of FIG. 3.

The adjustment means 61 preferably includes a guide means 131 for guidingly supporting the pulley block 73 as the piston rod 65 travels between the contracted position 67 and the extended position 69 (see, in general, FIGS. 3 and 4). The guide means 131 comprises a pair of elongated downwardly extending angle irons 133 which are spaced apart at a distance running parallel to one another as to allow the cable member 59 to pass therethrough the entire length thereof as shown in FIG. 4. The elongated metal angle irons 133 are fixedly attached at the upper ends 133' thereof to a crossmember or strut forming part of the mast 27 and located substantially between the upper and lower end 43, 45. The lower end 133" of the angle irons 133 may extend below the lower end 45 of the mast 27 (see, in general, FIG. 3).

The angle irons 133 provide a substantially flat guiding surface 137 for allowing the pulley block 73 to guidingly travel along the entire length thereof.

The towing apparatus 11 includes a plurality of alignment sheave members 139 for controlling the path of the cable member 59. The alignment sheave members 139 as shown in FIGS. 3 and 9 align the cable member 59 with the pulley block 73 and second sheave member 75 fixedly attached to the end of the piston rod 65 and with the front of the fifth sheave member 105 of the pulley block 81 at the upper end 43 of the mast 27. The alignment sheave members 139 include a first strut member 41, a second strut member 143 and a third strut member 145 with a sheave member 147 rotatably attached to the outer end of each strut member 141, 143, 145 in any manner well known to those skilled in the art such as by way of a pin 148 (see, in general, FIG. 3).

The first strut member 141 and its associated sheave member 147 aligns the cable member 59 to the front of the fifth sheave member 105 and fifth bight 103 of the cable members 59 thereof. The first strut member 141 is located on the upper end 43 of the mast 27 and attached thereto the upper right hand side of the mast 27 with the front of its associated sheave member 147 directly adjacent and in alignment with the front of the fifth sheave member 105 located in pulley block 81 (see, in general, FIGS. 3 and 9).

Figure 6:
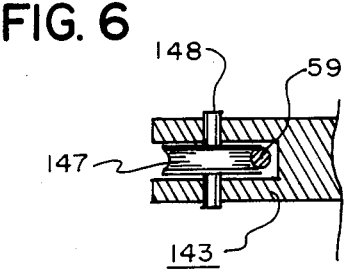
FIG. 6 is an enlarged sectional view substantially as taken on line VI—VI of FIG. 3.

The second strut member 143 and its associated sheave member 147 are positioned relatively below the first strut member 141 and is in vertical alignment therewith, with the cable member 59 running behind the sheave member 147 thereof as shown in FIG. 6 of the drawing therefore holding the cable member 59 in alignment and in contact with the sheave member 147 associated with the first strut member 141.

The third strut member 145 and its associated sheave member 147 are positioned relatively below the second strut member 143 and in vertical alignment with the relative first and second strut members 141 and 143 thereof. The third strut member 145 and associated sheave member 147 are positioned so that the cable member 59 moves along on the outward side of the sheave member 147.

Also note that the second end 83 of the cable member 59 and the second sheave member 75 and sheave member 147 are in relative vertical alignment with the front of the fifth sheave member 105 thereof.

The towing apparatus 11 includes a wheel means 149 mounted adjacent the second end 25 of the body means 13 for rotatably supporting the body means 13 thereof. The wheel means 149 includes a standard semi-tractor front axle member 151 which contains the standard accessories such as tires, rims, air brakes, etc. attached thereto in a manner well known to those skilled in the art.

The front axle member 151 includes a pair of spindle members 153 for allowing first and second wheel members 155, 157 to rotate about a horizontal axis in the typical manner. The inner ends of each spindle member 153 are attached to the body of the axle member 151 in a manner which allows the wheel members 155, 157 to caster around a vertical axis 159 perpendicular to the axis A of the first and second wheel members 155, 157. More specifically, the spindle member 153 is mounted to the body of the axle member 151 in any common well known manner such as by way of vertical king pins 161 well known to those skilled in the art extending through the outer ends of the body of the axle member 151 and through ears or the like on the inner end of each spindle member 153. Each spindle member 153 preferably contains a horizontal aperture 153' therethrough for receiving a tie rod arm means 163 which is securely held in place by a locking nut 165 (see, in general, FIGS.

10-12). A tie rod 167 is mounted to the tie rod arm means 163 in the typical manner by a protruding bolt and nut assembly 168 (see, in general, FIG. 10) fixedly attached to each end of the tie rod 167 thereof, for the alignment and unison turning of the first and second wheel members 155, 157 thereof.

The wheel means 149 is fixedly mounted to the body means 13 in a manner as to allow the tie rod 167 to face forward toward the first end 23 of the body means 13 with the first wheel member 155 on one side of the body means 13 and the second wheel member 157 on the other side of the body means 13 with the axle 151 and tie rod 167 parallel with the front and back of the body means 13 thereof. The wheel means 149 may be mounted to the body means 13 by any common well known means, such as by U-bolts 169 extending around the axle member 151 to space the axle member 151 at a distance below the body means 13 by way of a block means 170 as to allow the extending second end 51 of arm means 17 to be at the level of the front end of the disabled tractor 12 etc. and mounted in a manner well known to those who are skilled in the art.

The towing apparatus 11 includes a centering spring 171 with one end fixedly attached to the bottom side 25″ of the second end 25 of the body means 13 and with the other end fixedly mounted in any manner familiar to those skilled in the art such as by way of a bracket 173 substantially at the center of the tie rod 167 for the centering of the first and second wheel members 155, 157 thereof.

The towing apparatus 11 also includes a stabilizer shock means 175 for absorbing road shock transmitted to the first and second wheel members 155, 157. The stabilizer shock means 175 consists of a standard shock absorber with one end fixedly mounted to the bracket 177 on the tie rod 167 and with the other end fixedly mounted to a downwardly extending bracket 178 of the body means 13 and mounted in a manner as to allow the turning of the first and second wheel members 155, 157 to the right and to the left thereof.

The towing apparatus 11 includes a lock means 179 shown in FIGS. 10 thru 14 for selectively locking the first and second wheel members 155, 157 in a centered position thereof. The lock means 179 is mounted preferably on the right rear side of the axle member 151 next to the first wheel member 155 and opposite the tie rod 167 thereof.

The lock means 179 includes a base plate member 181 for attachment to the axle member 151 by well known U-bolts 183 or the like, a place member 185 consisting of an upper plate member 185′ and a lower plate member 185″ which are fixedly attached to the base plate member 181 in any typical manner such as by being welded thereto and are parallel and spaced apart from one another. Each plate member 185′, 185″ contains an aperture 187 in alignment with one another for receiving the protruding ends of a pivot shaft member 189 extending vertically therein. The lock means 179 includes a locking arm member 191 having a first end 191′ and a second end 191″ with the first end 191′ fixedly attached to the pivot shaft member 189 by any typical means such as being electric arc welded thereto and extending outwardly from between the upper and lower plate members 185′, 185″ thereof. The locking arm member 191 preferably has an offset substantially between the first and second ends 191′, 191″ thereof. The offset allows the second end 191″ of the locking arm member 191 to be positioned near the side of the spindle member 153.

Figure 11:
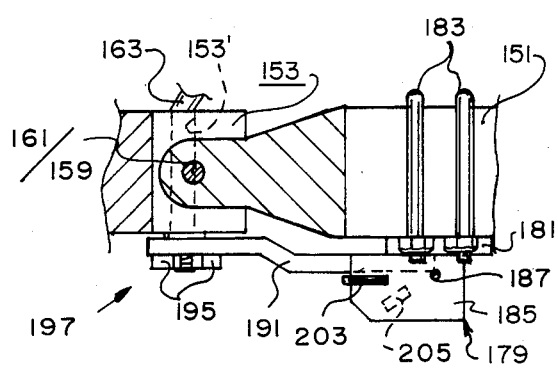
FIG. 11 is an enlarged sectional view substantially taken as on line XI—XI of FIG. 10 the view is shown rotated 180° to the left showing the lock means of the towing apparatus of the present invention in the locked position.
Figure 12:
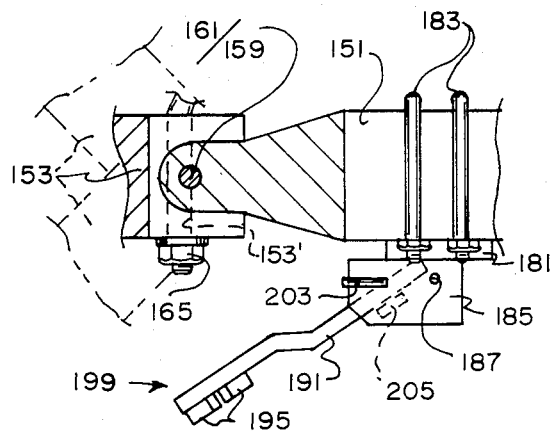
FIG. 12 is similar to FIG. 11 showing the lock means in the unlocked position.
Figure 13:
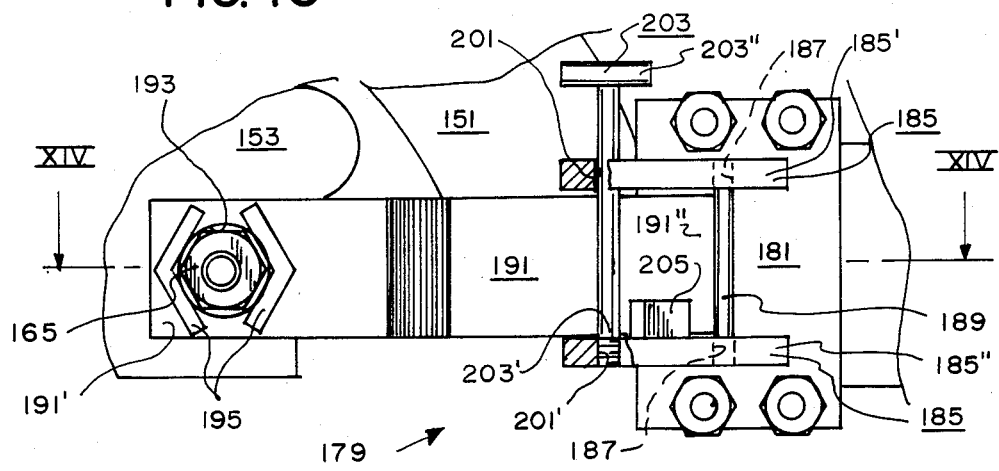
FIG. 13 is an enlarged front elevational view of the lock means.

The locking arm member 191 includes an aperture 193 for allowing the tie rod arm locking nut 165 to pass thereinto, and also contains a wall means 195 extending outwardly from and substantially around the aperture 195 and shaped at an angle as clearly shown in FIG. 13 to slide over the locking nut 165. When the locking arm member 191 is placed over the tie rod locking nut 165 as shown in FIG. 11, the lock means 179 is in the locked position 197 thus restricting the spindle member 153 from being turned and therefore locking the first and second wheel members 155, 157 in a centered position when the locking arm member 191 is pivoted away from the locking nut 165 as shown in FIG. 12. The locking arm member 191 is in the unlocked position 199 allowing the first and second wheel members 155, 157 to freely move to the left and to the right, as shown by phantom lines in FIG. 12. The upper plate member 185′ contains an aperture 201 in front of the locking arm member 191 when in the locked position 197 and in the back of the locking arm member 191 in the unlocked position 199 (see, in general, FIG. 13). The lower plate member 185″ contains a threaded aperture 201′ located in line with the aperture 201 in the upper plate member 185′ (see, in general, FIGS. 13 and 14). The lock means 179 includes a locking bolt member 203 that has a threaded first end 203′ for receiving into the threaded aperture 201′ in the lower plate member 185″ and a T-shaped second end 203″ extending above and through the upper plate member 185′ as shown in FIG. 13.

To move the locking member 191 from the locked position 197 into the unlocked position 199, you simply threadingly remove the locking bolt member 203 from the plate members 185 and manually move the locking arm member 191 over against a stop means 205 and replace the locking bolt member 203 into the apertures 201, 201′ which now are located behind the locking arm member 191. The stop means 205 may consist simply of a boss-like member fixedly attached to the upper surface of the lower plate member 185″ (see, in general, FIGS. 13 and 14), and eliminates movement of the locking arm member 191 while in the unlocked position 199.

The towing apparatus 11 includes a coupling means 21 for coupling the front of a disabled tractor-trailer rig 12 or the like to the second end 51 of the arm means 17 to allow the front of the disabled tractor-trailer rig 12 to be raised above the ground surface S when the second end 51 of the arm means 17 is moved to the raised position 53.

Figure 17:
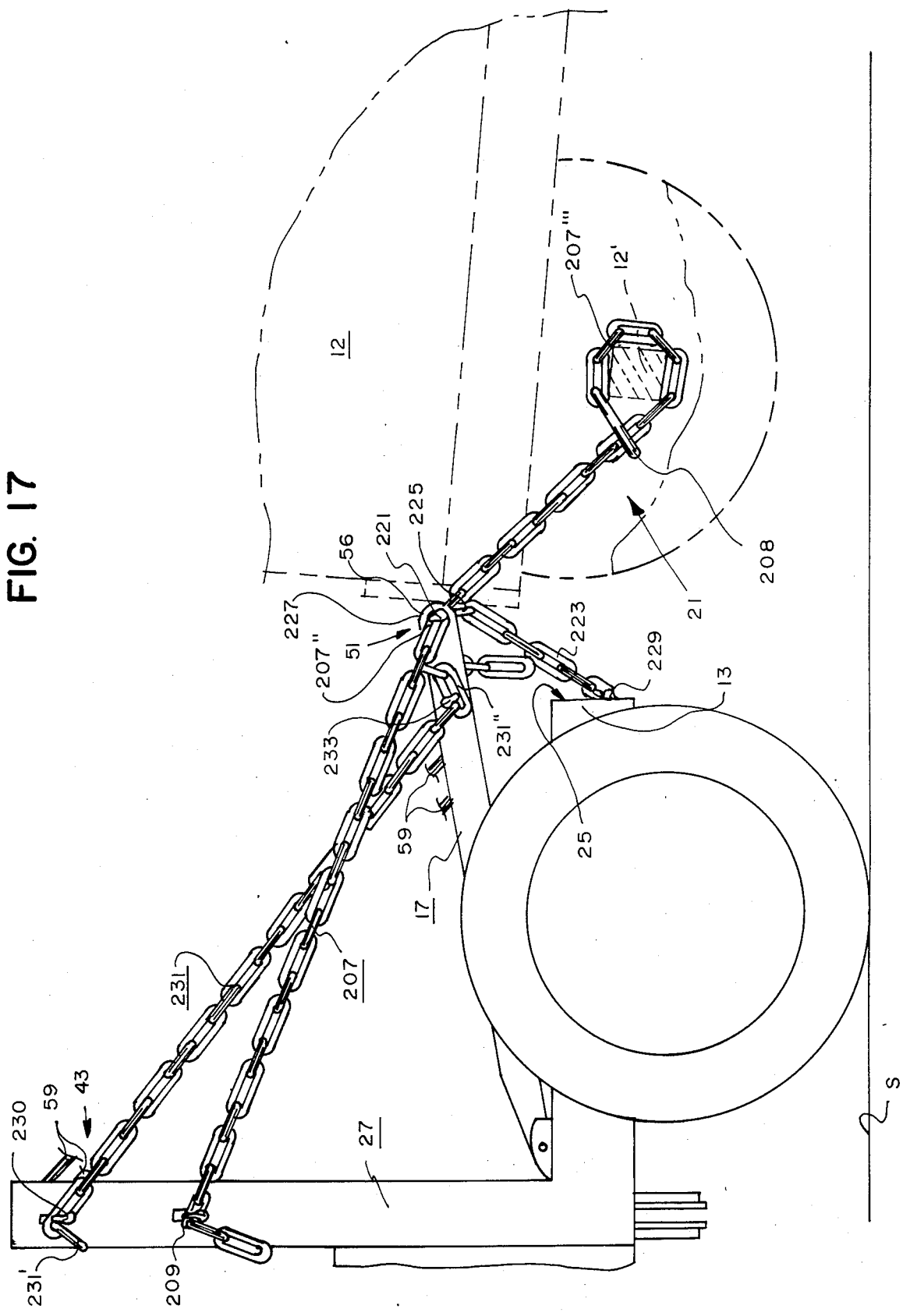
FIG. 17 is an enlarged side elevational view of the rear portion of the towing apparatus showing the arrangement of the chain members when attached to a disabled tractor etc.

The coupling means 21 includes a pair of elongated chain members 207. Each chain member 207 has a first end 207′ for attaching to a hook means 209 located on each side of the upper end 43 of the mast 27, an intermediate portion 207″ attached to a hook means 221 located on the second end 51 of the arm means 17, and a second end 207‴ including a hook means 208 attached thereto for engagement or wrapping the second end 207‴ of the chain member around the front axle 12′ of the disabled tractortrailer rig 12 or the like (see, in general, FIG. 17). The arm means 17 is at the lowered position 55 when the chain members 207‴ and hook means 208 are being attached to or removed from the front axle 12′ of the disabled tractor-trailer rig 12 or the like.

The towing apparatus 11 has a hold down safety feature which includes an elongated chain member 223 fixedly attached at one end to an eyelet means 225 located on the underneath side of the substantially curved crossmember 227 of the second end 51 of the arm member 17 and the other end is attached to hook means 229 located at the second end 25 of the body means 13 for preventing the second end 51 of the arm means 17 from being unintentionally raised such as by a sudden stopping of the towing tractor 15, etc.

A second safety feature includes a hold-up safety means which includes an elongated chain member 231 having a first end 231' fixedly attached by hook means 230 to the upper end 43 of the mast 27, and having a second end 231" received in a substantially inverted hook means 233 attached to each side of the second end 51 of the arm means 17 in case the cable member 59 breaks, thus dropping the front end of the disabled tractor-trailer rig 12 or the like and is also used to eliminate some of the strain from the cable member 59 while towing the disabled tractor-trailer rig 12 or the like.

When arriving at the final destination, the disabled tractor 12 may be unhooked from the trailer in a manner familiar to those skilled in the art and/or may be moved into a stall or place to be repaired. The disabled tractor 12 is securely coupled to the towing apparatus 11 in a manner which acts as a one piece unit. Therefore in backing the towing apparatus 11 the king pin 29 is the pivot point 33 of the towing apparatus 11.

Referring now to FIG. 18 the disabled tractor 12 or the like is to be backed into the direction indicated by arrow 235. Therefore, the front wheels of the towing tractor 15 are turned to the right causing pressure to be applied to the pivot point 33 which is the king pin 29 of the towing apparatus 11. Therefore side pressure is applied to the first and second wheel members 155, 157 whereby causing the first and second wheel members 155, 157 to be turned to the left therefore pushing the disabled tractor 12 or the like in the direction of the arrow 235.

On the other hand referring to FIG. 19 backing the disabled tractor 12 or the like in the direction indicated by arrow 237 the front wheels of the towing tractor 15 must be turned to the left. Therefore pressure is applied to the pivot point 33 of the towing apparatus 11 and side pressure is applied to the first and second wheel members 155, 157 of the body means 13 whereby causing the first and second wheel members 155, 157 to turn to the right therefore causing the disabled tractor 12 to be turned to the left shown by arrow 237.

When the towing apparatus 11 is backed with a coupled disabled tractor or the like thereto, the unit is backed in the same manner as a regular semi-trailer, with the first and second castering wheel members 155, 157 only supporting the weight of the front end of the disabled tractor 12 or the like that is securely coupled to the towing apparatus 11. As thus constructed, the present invention provides trucking firms, etc. with a portable towing apparatus 11 that may be attached to any fifth wheel type tractor therefore eliminating the need for the trucking firm to purchase an expensive wrecker which not only involves a large investment but would not be used all the time.

The towing apparatus 11 provides longer cable lift by using the described adjusting means for linearly adjusting the length of the cable member compared to the wear and weight placed on the cable of a conventional wrecker using a spool to which the cable is wound up on.

The towing apparatus 11 of the present invention provides the trucking firms etc. a safe economical towing device for towing disabled semi-tractors, semi-tractors and trailers, and dump trucks, etc.

Although the present invention has been described and illustrated with respect to a preferred embodiment thereof, it is not to be so limited since changes and modifications can be made which are within the full intended scope of the invention.

I claim:

1. A fifth wheel tractor-trailer towing apparatus adapted to be connected to a towing tractor for towing a disabled tractor-trailer, said apparatus comprising:
   (a) body means for being attached to the towing tractor; said body means having first and second ends and having an upwardly extending mast located between said first and second ends thereof; said mast having an upper end and a lower end;
   (b) arm means for movement between one or more raised positions and a lowered position, said arm means having a first end for being pivotally attached to said body means and having a second end; said first end of said arm means being pivotally attached to said body means substantially adjacent said lower end of said mast;
   (c) lifting means for moving said arm means between said raised and lowered positions, said lifting means including an elongated cable member for joining said body means and said arm means to one another in such a manner that adjustment of said cable member will cause said arm means to move between said raised and lowered positions, said lifting means including adjustment means for linearly adjusting the length of said cable member without causing said cable member to be wound up; said cable member extending between a point substantially adjacent said upper end of said mast and a point substantially adjacent said second end of said arm means; said adjustment means including piston means for engaging said cable member and movable between a contracted position in which said arm means is in said lowered position and an extended position in which said arm means is in said raised position; said piston means having a first end attached to said mast of said body means and having a second end for engaging said cable member; said adjustment means including a first sheave member attached to said arm means substantially adjacent said second end thereof, and including a second sheave member attached to said second end of said piston means; said cable member including a first end attached to said mast of said body means, including a first bight portion extending about said first sheave member, including a second bight portion extending about said second sheave member, and including a second end attached to said mast of said body means;
   (d) coupling means for coupling the front of the disabled tractor-trailer to said second end of said arm means and for causing the front of the disabled tractor-trailer to be raised when said second end of said arm member is moved to said raised position; and
   (e) wheel means for being mounted on said body means and for rollably supporting said body means.

2. The towing apparatus of claim 1 in which said adjustment means includes a third sheave member attached to said mast of said body means, includes a fourth sheave member attached to said arm means, and includes a fifth sheave member attached to said mast of said body means; and in which said cable member has a third bight portion extending about said third sheave member, includes a fourth bight portion extending about said fourth sheave member, and includes a fifth bight portion extending about said fifth sheave member.

3. The towing apparatus of claim 2 in which said adjustment means includes a plurality of alignment sheave members for use in controlling the path of said cable member.

4. The towing apparatus of claim 1 in which is included hold-up safety means for preventing said arm means from inadvertently lowering.

5. The towing apparatus of claim 4 in which said hold-up safety means includes an elongated chain member having a first end for being attached to said mast of said body means and having a second end for being attached to said arm means substantially adjacent said second end thereof.

6. The towing apparatus of claim 4 in which is included a hold-down safety means for preventing said arm means from inadvertently raising.

7. The towing apparatus of claim 6 in which said hold-down safety means includes an elongated chain member having a first end for being attached to said arm means substantially adjacent said second end thereof and having a second end for being attached to said body means.

* * * * *